(12) United States Patent
Yasrebi et al.

(10) Patent No.: US 8,363,640 B2
(45) Date of Patent: Jan. 29, 2013

(54) METHODS AND APPARATUS FOR HANDLING A COMMUNICATION SESSION FOR AN UNREGISTERED INTERNET PROTOCOL MULTIMEDIA SUBSYSTEM (IMS) DEVICE

(75) Inventors: Mehrad Yasrebi, Austin, TX (US); Bernard Ku, Austin, TX (US); Chaoxin Charles Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1115 days.

(21) Appl. No.: 11/669,367

(22) Filed: Jan. 31, 2007

(65) Prior Publication Data
US 2008/0181198 A1 Jul. 31, 2008

(51) Int. Cl.
*H04L 12/66* (2006.01)
(52) U.S. Cl. .................. 370/352; 455/404.1; 455/435.1; 455/466; 379/37; 379/45
(58) Field of Classification Search ............... 455/404.1, 455/411, 412.2, 414.1, 414.3, 432.3, 433, 455/435.1, 466, 521; 709/206, 227; 370/352
See application file for complete search history.

(56) References Cited

U.S. PATENT DOCUMENTS

| | | | |
|---|---|---|---|
| 6,775,534 B2 | 8/2004 | Lindgren et al. | |
| 6,807,409 B1 | 10/2004 | Davidson et al. | |
| 6,940,950 B2 | 9/2005 | Dickinson et al. | |
| 6,963,557 B2 * | 11/2005 | Knox | 370/352 |
| 7,031,747 B2 * | 4/2006 | Cyr et al. | 455/552.1 |
| 7,046,658 B1 | 5/2006 | Kundaje et al. | |
| 7,099,332 B2 | 8/2006 | Leung | |
| 7,340,241 B2 * | 3/2008 | Rhodes et al. | 455/404.1 |
| 7,403,517 B2 * | 7/2008 | Westman | 370/352 |
| 7,860,976 B2 * | 12/2010 | Hurtta | 709/227 |
| 8,036,659 B2 * | 10/2011 | Sun et al. | 455/435.1 |
| 2002/0085538 A1 | 7/2002 | Leung | |
| 2002/0163906 A1 | 11/2002 | Diachina et al. | |
| 2004/0001572 A1 | 1/2004 | Chin et al. | |
| 2004/0146040 A1 | 7/2004 | Phan-Anh et al. | |
| 2004/0190522 A1 | 9/2004 | Aerrabotu et al. | |
| 2004/0198310 A1 | 10/2004 | Aerrabotu et al. | |
| 2004/0198311 A1 | 10/2004 | Aerrabotu et al. | |
| 2005/0083911 A1 | 4/2005 | Grabelsky et al. | |

(Continued)

FOREIGN PATENT DOCUMENTS

| | | |
|---|---|---|
| WO | WO2006102943 | 10/2006 |
| WO | WO2006118415 | 11/2006 |

(Continued)

OTHER PUBLICATIONS

U.S. Appl. No. 11/451,202, entitled "Analog Telephone Adapter and Emergency Proxy", filed Jun. 12, 2006, 22 pages.

*Primary Examiner* — Anthony Addy
(74) *Attorney, Agent, or Firm* — Hanley, Flight & Zimmerman, LLC

(57) ABSTRACT

Methods and apparatus for handling a communication session for an unregistered Internet Protocol Multimedia Subsystem (IMS) device are disclosed. An example method comprises receiving an IMS session initiation message from an un-registered user endpoint, determining whether the IMS session initiation message is directed to an exception endpoint, and establishing an IMS session on behalf of the unregistered user endpoint when the IMS session initiation is directed to the exception endpoint.

28 Claims, 5 Drawing Sheets

U.S. PATENT DOCUMENTS

| | | |
|---|---|---|
| 2005/0105464 A1 | 5/2005 | Acharya et al. |
| 2005/0122958 A1 | 6/2005 | Shim et al. |
| 2005/0202819 A1 | 9/2005 | Blicker |
| 2005/0213565 A1 | 9/2005 | Barclay et al. |
| 2005/0286504 A1 | 12/2005 | Kwon |
| 2006/0039539 A1 | 2/2006 | Goldman et al. |
| 2006/0115057 A1 | 6/2006 | Laliberte |
| 2006/0140351 A1 | 6/2006 | Croak et al. |
| 2006/0264213 A1 | 11/2006 | Thompson |
| 2006/0274729 A1 | 12/2006 | Self |
| 2006/0281457 A1 | 12/2006 | Huotari et al. |
| 2008/0092226 A1* | 4/2008 | Horvath et al. ............... 726/12 |
| 2008/0139166 A1* | 6/2008 | Agarwal et al. ............ 455/404.1 |
| 2008/0160996 A1* | 7/2008 | Li et al. .......................... 455/433 |
| 2008/0200170 A1* | 8/2008 | Sun et al. .................. 455/435.1 |
| 2008/0215736 A1* | 9/2008 | Astrom et al. ................. 709/226 |
| 2008/0247384 A1* | 10/2008 | Arauz-Rosado et al. ...... 370/352 |
| 2009/0089435 A1* | 4/2009 | Terrill et al. .................. 709/227 |

FOREIGN PATENT DOCUMENTS

| | | |
|---|---|---|
| WO | WO2006118416 | 11/2006 |

* cited by examiner

METHODS AND APPARATUS FOR HANDLING A COMMUNICATION SESSION FOR AN UNREGISTERED INTERNET PROTOCOL MULTIMEDIA SUBSYSTEM (IMS) DEVICE

FIELD OF THE DISCLOSURE

This disclosure relates generally to Internet Protocol Multimedia Subsystem (IMS) networks and, more particularly, to methods and apparatus for handling a communication session for an unregistered IMS device.

BACKGROUND

In communication networks, such as Internet Protocol Multimedia Subsystem (IMS) networks, communication sessions may be blocked to and/or from an IMS device until and/or unless the IMS device is registered with an IMS network. Such registrations may be used to enable IMS devices to access IMS services provided by the IMS network.

DETAILED DESCRIPTION

Methods and apparatus for handling a communication session for an unregistered Internet Protocol Multimedia Subsystem (IMS) device are disclosed. A disclosed example method includes receiving an IMS session initiation message from an un-registered user endpoint, determining whether the IMS session initiation message is directed to an exception endpoint, and establishing an IMS session on behalf of the unregistered user endpoint when the IMS session initiation is directed to the exception endpoint. Another disclosed example method includes initiating a communication session at an unregistered IMS device to a public safety answering point (PSAP); and participating in the communication session, wherein the communication session is established before the IMS device is registered to an IMS network.

A disclosed example apparatus includes an exception checker to determine whether a communication session initiation invitation received from an un-registered IMS device is directed to an exception endpoint by comparing a destination specified in the communication session initiation invitation to a list of one or more exception endpoints; and an inviter to send a second communication session invitation to the exception endpoint when the destination matches the exception endpoint.

Figure 1:
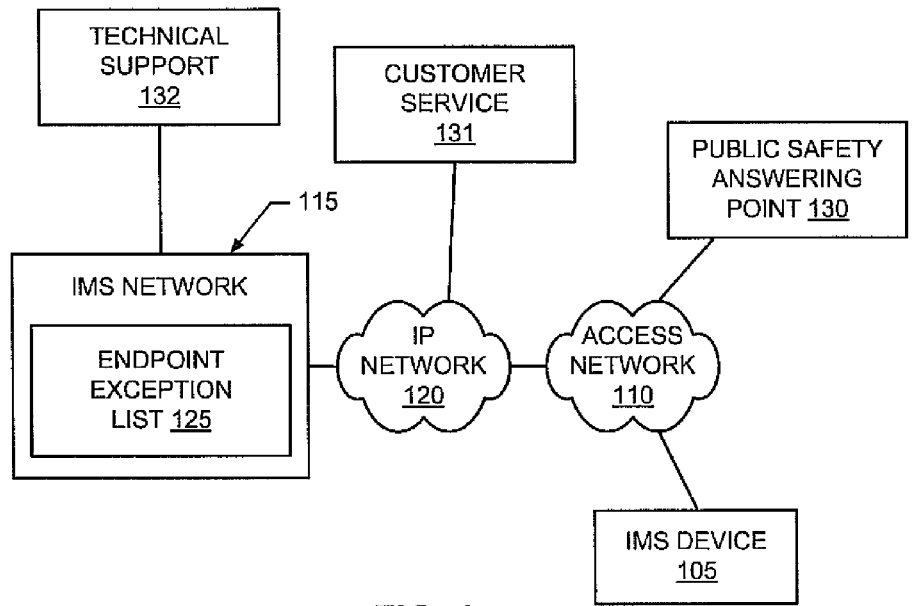
FIG. 1 is a schematic illustration of an example Internet Protocol Multimedia Subsystem (IMS) based communication system constructed in accordance with the teachings of the invention.

FIG. 1 is a schematic illustration of an example Internet Protocol Multimedia Subsystem (IMS) communication system that includes any number and/or type(s) of IMS devices, one of which is illustrated with reference number 105 in FIG. 1. Example IMS devices 105 include, but are not limited to, an IMS (e.g., voice over Internet Protocol (VoIP)) phone, an IMS residential gateway, an IMS enabled personal computer (PC), an IMS endpoint, a wireless IMS device (e.g., a wireless-fidelity (WiFi) Internet protocol (IP) phone), or an IMS adapter (e.g., an analog telephone adapter (ATA)), and/or an IMS kiosk. The example IMS device 105 of FIG. 1 may be implemented and/or found at any number and/or type(s) of locations. Further, IMS devices 105 may be fixed location, substantially fixed location and/or mobile devices. Moreover, IMS devices 105 may have equipment communicatively and/or electrically coupled to them. For example, an IMS ATA may be coupled to a telephone, and/or an IMS residential gateway may be coupled to a personal computer and/or set-top box.

To access IMS communication services throughout and/or within a site, location, building, geographic area and/or geographic region, the example IMS communication system of FIG. 1 includes any number and/or type(s) of access networks, one of which is illustrated in FIG. 1 with reference number 110. The example access network 110 of FIG. 1 can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks.

To provide IMS communication services (e.g., telephone services, Internet services, data services, messaging services, instant messaging services, electronic mail (email) services, chat services, video services, audio services, gaming services, etc.), the example IMS communication system of FIG. 1 includes one or more IMS networks, one of which is illustrated in FIG. 1 with reference numeral 115. An example manner of implementing the example IMS network 115 of FIG. 1 is described below in connection with FIG. 2.

In the example IMS communication system of FIG. 1, the IMS device 105 is communicatively coupled to the IMS network 115 via the access network 110 and any number and/or type(s) of private and/or public Internet protocol (IP) based communication networks 120 such as, for example, the Internet. In some examples, the IMS device 105 may be communicatively coupled to the access network 110 via one or more additional IP based networks and/or devices (not shown), such as a local area network (LAN), a gateway and/or a router located within a place of business, school and/or residence. In the illustrated example of FIG. 1, the IMS device 105 is communicatively coupled to the example access network 110 via any number and/or type(s) of past, current and/or future communication network(s), communication system(s), communication device(s), transmission path(s), protocol(s), technique(s), specification(s) and/or standard(s). For instance, the example IMS device 105 may be coupled to the example access network 110 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), etc. Moreover, the example access network 110 and/or the example IP network 120 of FIG. 1 may extend geographically to include a location near to and/or encompassing one or more IMS devices 105. For example, the access network 110 may include a wireless access point (not shown) by which, for example, a WiFi IP phone 105 connects to the IP network 120 and the IMS network 115.

In the example IMS communication system of FIG. 1, the example access network 110, the IP network 120 and the IMS network 115 need not be owned, implemented, and/or operated by a single service provider. For example, the IMS device 105 may access IMS services provided by a first IMS network 115 owned, operated and/or implemented by a first service provider via an access network 110 owned, operated and/or implemented by a second service provider. However, any or all of the access network 110, the IMS network 115 and/or the IP network 120 may be operated by a single service provider.

In the interest of brevity and clarity, throughout the following disclosure references will be made to the example IMS communication system, the example IMS network 115 and/or the example IMS device 105 of FIG. 1. However, it should be understood that the methods and apparatus to handle IMS communication sessions for un-registered IMS devices are applicable to other examples and/or types of IMS devices, IMS networks and/or IMS communication systems.

When the example IMS device 105 of FIG. 1 is registered to and/or with the IMS network 115 (i.e., the IMS device 105 is a registered IMS device 105), communication sessions can be handled (e.g., initiated, processed, established and/or routed) in accordance with any number and/or type(s) of past, present and/or future communication protocol(s), technique(s), specification(s) and/or standard(s). Today, IMS networks are configured to block communication sessions initiated by and/or destined to the example IMS device 105 when the IMS device 105 is not currently registered with an IMS network. However, in some circumstances, it may be desirable to allow certain communication sessions to be initiated by and/or at the IMS device 105 even though the IMS device 105 is not currently registered (i.e., to permit network usage by an unregistered IMS device 105). For example, it may be desirable to allow a user of an IMS device 105 to initiate a communication session to one or more exception endpoints such as, for instance, to emergency personnel (e.g., to a public safety answering point (PSAP) 130), to a customer service representative 131, to a technical support technician 132, to a security system monitoring station, to a network operations center, to a testing and/or diagnostic server, and/or to a network operator. For example, the user of the IMS device 105 may use a keypad of the IMS device 105 to dial 911 and/or 311 to reach the example PSAP 130 and/or a so-called "1-800" number to reach the example customer service representative 131. Such communication sessions may be used to report emergencies, and/or to assist in, for example, the setup, testing, debugging and/or establishment of an account so that the IMS device 105 can register to the IMS network 115. As illustrated in FIG. 1, exception endpoints 130-132 may be communicatively coupled to the IMS network 115 directly, and/or via the IP network 120 and/or the access network 110. For example, the example PSAP 130 may be associated with a PSTN system (e.g., the example PSTN 255 of FIG. 2) associated with and/or coupled to the example IMS network 115.

To define a set of exception endpoints (i.e., destinations to which communication sessions may be initiated by an unregistered IMS device 105), the example IMS network 115 of FIG. 1 includes an endpoint exception list 125. The example endpoint exception list 125 of FIG. 1 includes a list of allowed exception endpoints to which communication sessions may be initiated by unregistered IMS devices 105 (e.g., a list of PSAPs, 911, 311, a list of customer service telephone numbers, a list of security system monitoring station numbers, a list of network operations center number, a list of testing and/or diagnostic server numbers, and/or a list of technical support numbers). An example data structure that may be used to implement the example endpoint exception list 125 of FIG. 1 is described below in connection with FIG. 4.

When a communication session is initiated by an unregistered IMS device 105 (e.g., when the IMS device 105 sends a session initiation protocol (SIP) INVITE protocol message), the example IMS network 115 of FIG. 1 compares the destination specified in the initiation request (e.g., SIP INVITE) with the entries in the endpoint exception list 125. If the specified destination is found in the endpoint exception list 125, the example IMS network 115 of FIG. 1 establishes the requested communication session to the destination specified in the initiation request. Once the requested communication session is established, a user of the IMS device 105 is able to interact with a device and/or person at the destination by, for example, speaking and/or listening. If the specified destination is not found in the endpoint exception list 125, the example IMS network 115 rejects the communication session by, for example, sending a SIP NACK message to the IMS device 105.

It will be readily apparent to persons of ordinary skill in the art that the methods and apparatus for handling communication sessions for an unregistered IMS device 105 described herein require no specific and/or modified behavior and/or actions on the part of the IMS device 105 beyond those currently defined in any number of past and/or present communication protocol(s), standard(s) and/or specification(s). In particular, the example IMS device 105 sends a SIP INVITE protocol message to initiate a communication session regardless of whether the IMS device 105 is currently registered to the IMS network 115. Moreover, the SIP INVITE message sent by an unregistered IMS device 105 requires no additional and/or alternative header fields and/or payload values beyond those commonly implemented in the industry for IMS networks and/or IMS communication systems. Instead, as described below in more detail, the example IMS network 115 of FIG. 1 determines how and/or whether to establish a communication session requested by an unregistered IMS device 105 based upon the destination specified in the communication session request.

Figure 2:
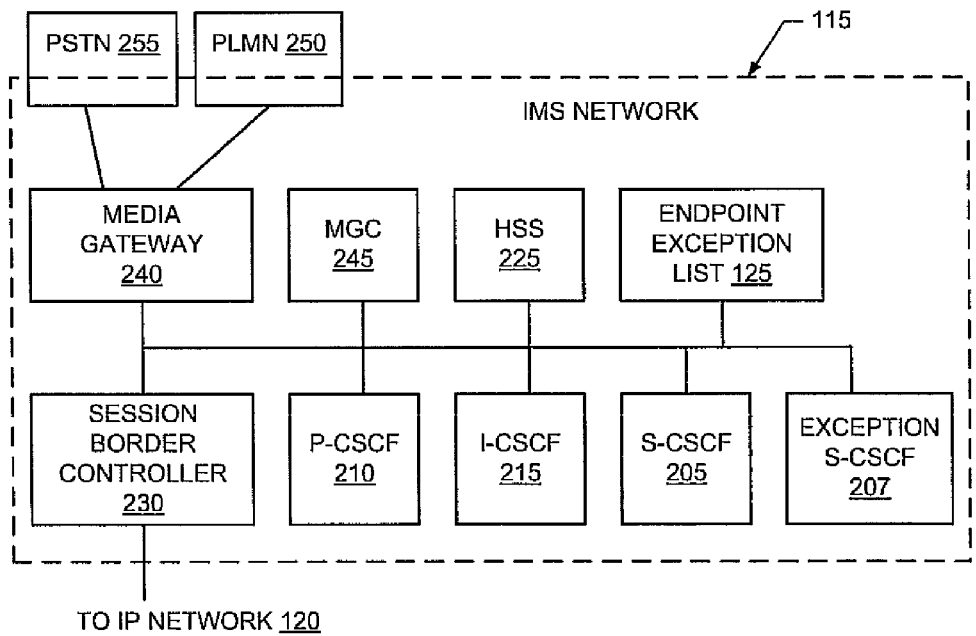
FIG. 2 illustrates an example manner of implementing the example IMS network of FIG. 1.

FIG. 2 illustrates an example manner of implementing the example IMS network 115 of FIG. 1. In the illustrated example IMS communication system of FIG. 1, each IMS device (e.g., the example IMS device 105) that is registered to the example IMS network 115 is associated with and/or assigned to a serving call session control function (S-CSCF) server 205 responsible for handling incoming and/or outgoing IMS communication sessions (e.g., telephone calls, and/or data and/or video sessions) associated with its registered IMS devices 105. That is, an S-CSCF 205 performs session control, maintains session state and/or enables communication with call feature servers for its associated and/or registered IMS devices 105. For instance, for a given registered IMS device 105 initiating an outgoing telephone call, a SIP INVITE message is routed by the IMS network 115 to the S-CSCF 205 associated with that particular IMS device 105. The associated S-CSCF 205, in turn, routes and/or assists in establishing an IMS communication path and/or IMS communication session (e.g., a telephone call) with a called device (i.e., a called party). Likewise, an IMS device 105 receiving an incoming communication session receives a SIP INVITE message via its associated S-CSCF 205. While a single S-CSCF server 205 is illustrated in FIG. 2, the IMS network 115 may include any number and/or type(s) of S-CSCF servers and each such S-CSCF server may support any number and/or type(s) of IMS devices 105.

To define a set of destinations to which communication sessions may be initiated by an unregistered IMS device 105, the example IMS network 115 of FIG. 2 includes the endpoint exception list 125. The example endpoint exception list 125 of FIG. 2 specifies a list of allowed exception endpoints to which communication sessions may be initiated by unregistered IMS devices 105 (e.g., a list of PSAPs, 911, 311, a list of customer service telephone numbers, a list of security system monitoring station numbers, a list of network operations center numbers, a list of testing and/or diagnostic server numbers, and/or a list of technical support numbers). As explained below, the example endpoint exception list 125 of FIG. 2 is used by a proxy call session control function (P-CSCF) server 210 and/or an exception S-CSCF 207 to determine when a communication session being initiated by an unregistered IMS device 105 is being initiated to an allowed exception endpoint. An example data structure that may be used to implement the example endpoint exception list 125 of FIG. 2 is described below in connection with FIG. 4.

To perform session control, maintain session state and/or establish communication sessions for any unregistered IMS devices 105, the example IMS network 115 of FIG. 2 includes one or more exception S-CSCF servers, one of which is illustrated in FIG. 2 with reference numeral 207. As noted above, all registered IMS devices are assigned to a particular S-CSCF server 205. Unassigned IMS devices 105 are not assigned to any such server. Accordingly, the example system of FIG. 1 includes the exception S-CSCF 207 to handle communication sessions for the unregistered IMS devices 105. As described below in connection with FIGS. 5 and 6, the example exception S-CSCF 207 of FIG. 2 cooperates with a P-CSCF sever 210 to determine if a communication session being initiated by an unregistered IMS device 105 is to be initiated to an allowed exception endpoint (e.g., a destination listed in the example endpoint exception list 125). If the communication session is being initiated to an allowed exception endpoint (e.g., the request to initiate the communication session identifies an exception endpoint), the example exception S-CSCF 207 of FIG. 2 establishes and/or assists in the establishment of the communication session between the unregistered IMS device 105 and the exception endpoint. If the destination is not identified in the exception endpoint list 125, the example exception S-CSCF 207 and/or, more generally, the example IMS network 115 rejects the communication session by, for example, sending a SIP NACK message to the IMS device 105. An example manner of implementing the example exception S-CSCF 207 of FIG. 2 is described below in connection with FIG. 3.

To provide an access entry point for an IMS device 105 into the IMS network 115, the example IMS network 115 of FIG. 2 includes any number and/or type(s) of proxy call session control function (P-CSCF) servers, one of which is illustrated in FIG. 2 with reference number 210. The example P-CSCF 210 of FIG. 2, among other things, routes SIP messages between a registered IMS device 105 and its associated S-CSCF 205, and/or between an unregistered IMS device 105 and the exception S-CSCF 207.

To locate the S-CSCF 205 associated with a registered IMS device 105 and/or the exception S-CSCF 207 for unregistered IMS devices 105, the example IMS network 115 of FIG. 2 includes any number and/or type(s) of interrogating call session control function (I-CSCF) servers, one of which is illustrated in FIG. 2 with reference number 215. The example I-CSCF 215 of FIG. 2 serves as a contact point within the example IMS network 115 for connections destined for an IMS device 105 of the IMS communication system and/or for an IMS device 105 currently located within the serving area of the IMS communication system (e.g., a roaming subscriber). For example, for an incoming communication session (e.g., a telephone call), the example I-CSCF 215 identifies which S-CSCF 205 to which the destination IMS device 105 is registered. If the IMS device 105 is currently unregistered, the example I-CSCF 215 instead identifies the exception S-CSCF 207 assigned to handle communication sessions for unregistered IMS devices 105. Based upon the S-CSCF 205, 207 identified by the I-CSCF 215, the P-CSCF 210 routes IMS protocol messages between the IMS device 105 and the appropriate S-CSCF 205, 207.

To manage subscriber information, and/or to enable subscribers and/or servers to locate other servers, subscribers and/or destinations, the example IMS network 115 of FIG. 2 includes any number and/or type(s) of home subscriber server(s) (HSSs), one of which is illustrated in FIG. 2 with reference numeral 225. The example HSS 225 of FIG. 2 maintains a profile and/or one or more preferences for each subscriber and/or IMS device 105 of the IMS network 115. A device profile may be structured and/or arranged using any of a variety of headers, fields, sub-fields. Example data and/or information that may be included in a profile includes an assigned telephone number, an IP address for a serving VoIP call processor, a quality of service (QoS) parameter and/or a maximum allowable transmit bandwidth. The example I-CSCF 215 of FIG. 2 uses information contained in the HSS 225 to, for example, determine and/or locate the S-CSCF 205 associated with a particular subscriber and/or IMS device 105. The example HSS 225 can also be used to store a default profile that may be used, for example, with unregistered IMS devices 105 not yet having an account established with and/or on the IMS network 115.

To implement border and/or gateway functions, the example IMS network 115 of FIG. 2 includes any number and/or type(s) of session border controllers, one of which is illustrated in FIG. 2 with reference numeral 230. The example session border controller 230 of FIG. 2 is implemented in accordance with the Alliance for Telecommunications Industry Solutions (ATIS)/Telecoms & Internet converged Services & Protocols for Advanced Networks (TISPAN) for Next Generation Networks (NGN). The example session border controller 230 may, in some instances, exert control over the signaling and/or media streams involved in setting up, conducting, and/or tearing down calls by, for example, modifying signaling (e.g., resolving between different IMS signal protocols), modifying IMS protocol messages and/or modifying media streams (e.g., transcoding) passing between calling and/or called parties. By configuring and/or provisioning the session border controller 230, an IMS service provider can control the kinds of call that can be placed through their IMS network 115.

To process and/or handle communication service data between an IMS device 105 and a public land mobile network (PLMN) 250 (e.g., a cellular communication network) and/or a public switched telephone network (PSTN) 255, the example IMS network 115 of FIG. 2 includes any number and/or type(s) of media gateways, one of which is illustrated in FIG. 2 with reference number 240. Using any number and/or type(s) of technique(s), method(s) and/or algorithm (s), the media gateway 240 of FIG. 2 performs any appropriate media data conversion between, for example, a circuit-based transmission format used by the PSTN 255 and a packet-based format and/or data structure used by the IMS network 115, the IP network 120, and/or the IMS device 105.

To control the example media gateway 240, the example IMS network 115 of FIG. 2 includes any number and/or type(s) of media gateway controllers (MGC), one of which is illustrated in FIG. 2 with reference number 245. Using any number and/or type(s) of technique(s), method(s) and/or in accordance with any past, present and/or future specification (s) and/or standard(s) such as, for example, Internet Engineering Task Force (IETF) Request for Comment (RFC) 3015 and/or the International Telecommunications Union (ITU) H.248 standard, the example MGC 245 of FIG. 2 performs signaling, session control and/or session management for incoming and/or outgoing IMS communication sessions that originate in and/or terminate in, for example, the example PLMN 250 and/or the PSTN 255.

As illustrated in FIG. 2, the example IMS network 115 may include an interface to and/or contain a portion of the PLMN 250, an interface to and/or contain a portion of the PSTN 255, and/or an interface to and/or contain a portion of any number and/or type(s) of additional communication networks. For example, using any number and/or type(s) of technique(s), method(s), protocol(s) and/or technology(-ies), the media gateway 240, the MGC 245 and the PSTN 255 can facilitate telephone calls and/or data communication between a PSTN-based phone (not shown) and the example IMS devices 105.

The example PLMN 250 and/or the example PSTN 255 of FIG. 2 may be implemented by any number and/or type(s) of communication devices, switches, protocols, systems and/or technologies. For instance, the example PLMN 250 may include any number of cellular base stations that can transmit cellular signals to and/or receive cellular signals from a cellular communication device (not shown) using any type(s) of protocols (e.g., time-division multiple access (TDMA), code-division multiple access (CDMA), orthogonal frequency-division multiple access (OFDM), Global System for Mobile Communications (GSM), etc.). In some examples, an interface between the MGC 240 and the PLMN 250 is implemented via the PSTN 255.

While an example IMS communication system, an example IMS device 105 and example IMS networks 115 have been illustrated in FIGS. 1 and 2, the devices, networks, systems, and/or processors illustrated in FIGS. 1 and/or 2 may be combined, divided, re-arranged, eliminated and/or implemented in any of a variety of ways. For example, the example exception S-CSCF 207 may include and/or implement an S-CSCF (e.g., the example S-CSCF 205) and/or a P-CSCF (e.g., the example P-CSCF 210) so that the exception S-CSCF 207 is capable of handling communication sessions for registered and/or unregistered IMS devices 105. Further, the example IMS device 105 and/or the example IMS networks 115 may be implemented by hardware, software, firmware and/or any combination of hardware, software and/or firmware. Further still, the example IMS communication system, the example IMS device 105 and/or the example IMS networks 115 may include additional servers, systems, networks, gateways, portals, and/or processors than those illustrated in FIGS. 1 and/or 2, and/or may include more than one of any or all of the illustrated devices, servers, networks, systems, gateways, portals, and/or processors. For example, an IMS communication system may include any number and/or type(s) of IMS devices 105, and/or any number and/or type(s) of access networks 110, IMS networks 115 and/or IP networks 120. Additionally or alternatively, the example IMS networks 115 of FIGS. 1 and 2 may include one or more additional call feature servers and/or application servers (not shown) that provide additional service features to subscribers (e.g., voicemail, call trees, etc.).

It will be readily appreciated by persons of ordinary skill in the art that the example S-CSCF 205, the example exception S-CSCF 207, the example P-CSCF 210, the example I-CSCF 215, the example HSS 225, the example session border controller 230, the example media gateway 240 and the example MGC 245 illustrated in FIG. 2 are logical entities of the example IMS network 115. They may, therefore, be implemented separately and/or in any combination using, for example, machine accessible instructions executed by one or more computing devices and/or computing platforms.

Figure 3:
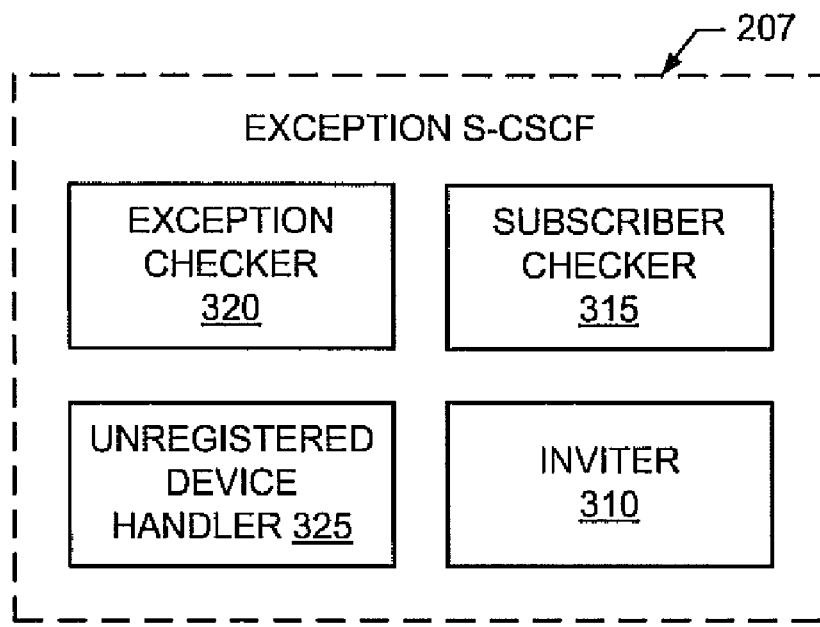
FIG. 3 illustrates an example manner of implementing the example exception call session control function servers of FIG. 2.

FIG. 3 illustrates an example manner of implementing the example exception S-CSCF 207 of FIG. 2. While the illustrated device of FIG. 3 may be used to implement some or all of the example P-CSCF 210 and/or the example S-CSCF 205 of FIG. 2, for ease of discussion the example device of FIG. 3 will be referred to simply as the exception S-CSCF 207.

To process SIP messages and/or protocols, the example exception S-CSCF 207 of FIG. 3 includes any number and/or type(s) of inviters, one of which is illustrated in FIG. 3 with reference numeral 310. The example inviter 310 of FIG. 3 handles and/or processes incoming and/or outgoing SIP messages. In some examples, the example inviter 310 is implemented by and/or implements a SIP server module. The example inviter 310 of FIG. 3 implements a state engine and/or maintains state information for SIP transactions, dialogs, and communication sessions including, for example, handling registrations and incoming/outgoing calls as defined in Internet Engineering Task Force (IETF) Request for Comment (RFC) 3261.

To determine if a communication session initiation request is received from a registered or an unregistered IMS device 105, the example exception S-CSCF 207 of FIG. 3 includes a subscriber checker 315. The example subscriber checker 315 of FIG. 3 queries the example HSS 225 of FIG. 2 to determine the registration status of an IMS device 105. The example subscriber checker 315 also queries the example HSS 225 to determine whether there is a profile for an unregistered IMS device 105 stored in the HSS 225. The query results are used, as described in more detail below, to determine how to handle a communication session request for an IMS device 105.

To determine if a communication session being initiated by an unregistered IMS device 105 is being initiated to an allowed exception endpoint, the example exception S-CSCF 207 of FIG. 3 includes an exception checker 320. The example exception checker 320 of FIG. 3 queries a list of exception endpoints (e.g., the example endpoint exception list 125 of FIGS. 1 and/or 2) based upon a destination specified in a communication session request (e.g., a SIP INVITE protocol message).

To handle communication sessions for unregistered IMS devices 105, the example exception S-CSCF 207 of FIG. 3 includes an unregistered device handler 325. The example unregistered device handler 325 of FIG. 3 uses the results of queries performed by the subscriber checker 315 and/or the example exception checker 320 to determine how to handle a communication session request received from an unregistered IMS device 105. For example, if a communication session request (e.g., a SIP INVITE) is directed to an allowed exception endpoint (e.g., as determined by the exception checker 320) and the IMS device 105 is unregistered (e.g., as determined by the subscriber checker 315), the example unregistered device handler 325 instructs the inviter (e.g., a SIP server module) 310 to establish and/or assist in establishing the requested communication session.

While an example exception S-CSCF 207 is illustrated in FIG. 3, the example exception S-CSCF 207 may be implemented using any number and/or type(s) of other and/or additional logic, processors, devices, components, circuits, modules, interfaces, etc. Further, the logic, processors, devices, components, circuits, modules, elements, interfaces, etc. illustrated in FIG. 3 may be combined, divided, re-arranged, eliminated and/or implemented in any of a variety of ways. Additionally, the example exception S-CSCF 207 may be implemented as any combination of firmware, software, logic and/or hardware. For example, the example inviter 310, the example subscriber checker 315, the example exception checker 320, the example unregistered device handler 325 and/or, more generally, the example exception S-CSCF 207 may be implemented as hardware, firmware and/or software (e.g., the example coded instructions 710 and/or 712 of FIG. 7) executed by, for example, the example processor 705 of FIG. 7. Moreover, an exception S-CSCF 207 may include additional logic, processors, devices, components, circuits, interfaces and/or modules than those illustrated in FIG. 3 and/or may include more than one of any or all of the illustrated processors, devices, components, circuits, interfaces and/or modules.

Figure 4:
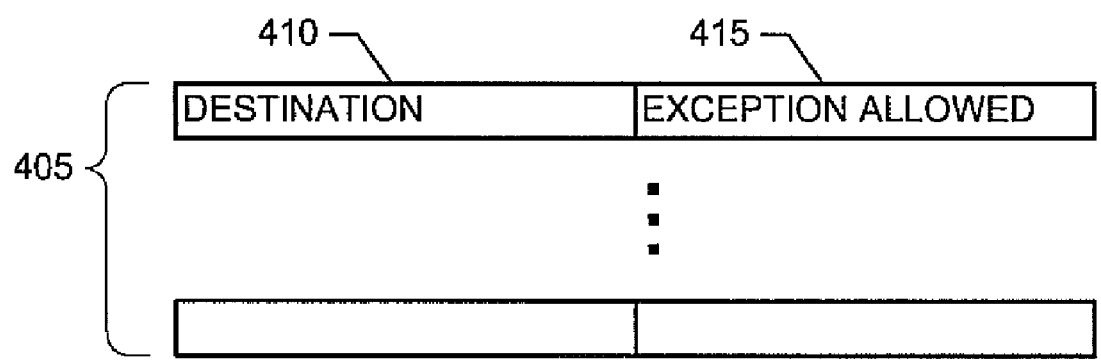
FIG. 4 illustrates an example data structure that may be used to implement any or all of the example endpoint exception lists of FIGS. 1 and 2.

FIG. 4 illustrates an example data structure that may be used to implement any or all of the example endpoint exception lists 125 of FIGS. 1 and 2. The example data structure of FIG. 4 includes a plurality of entries 405 for respective ones of a plurality of possible and/or allowed exception endpoints.

To specify an endpoint, each of the example entries 405 of FIG. 4 includes a destination field 410. The example destination field 410 of FIG. 4 contains an alphanumeric string that represents a valid destination for an IMS communication session. For example, the destination field 410 may contain a SIP uniform resource identifier (URI) and/or an E.164 telephone number.

To specify whether the endpoint is an allowed exception endpoint, each of the example entries 405 of FIG. 4 includes an exception allowed field 415. The example exception allowed field 415 of FIG. 4 contains a binary value and/or flag that represents whether the destination represented by the destination field 410 is an allowed exception endpoint (e.g., TRUE or "1" indicates that the destination field 410 specifies an allowed exception endpoint).

While an example data structure is illustrated in FIG. 4, the example data structure may be implemented using any number and/or type(s) of other and/or additional fields and/or data. Further, the fields and/or data illustrated in FIG. 4 may be combined, divided, re-arranged, eliminated and/or implemented in any of a variety of ways. For example, the exception allowed field 415 could be omitted such that all destinations specified in the example data structure of FIG. 4 correspond to allowed exception endpoints. Moreover, the example data structure may include additional fields and/or data than those illustrated in FIG. 4 and/or may include more than one of any or all of the illustrated fields and/or data.

Figure 5:
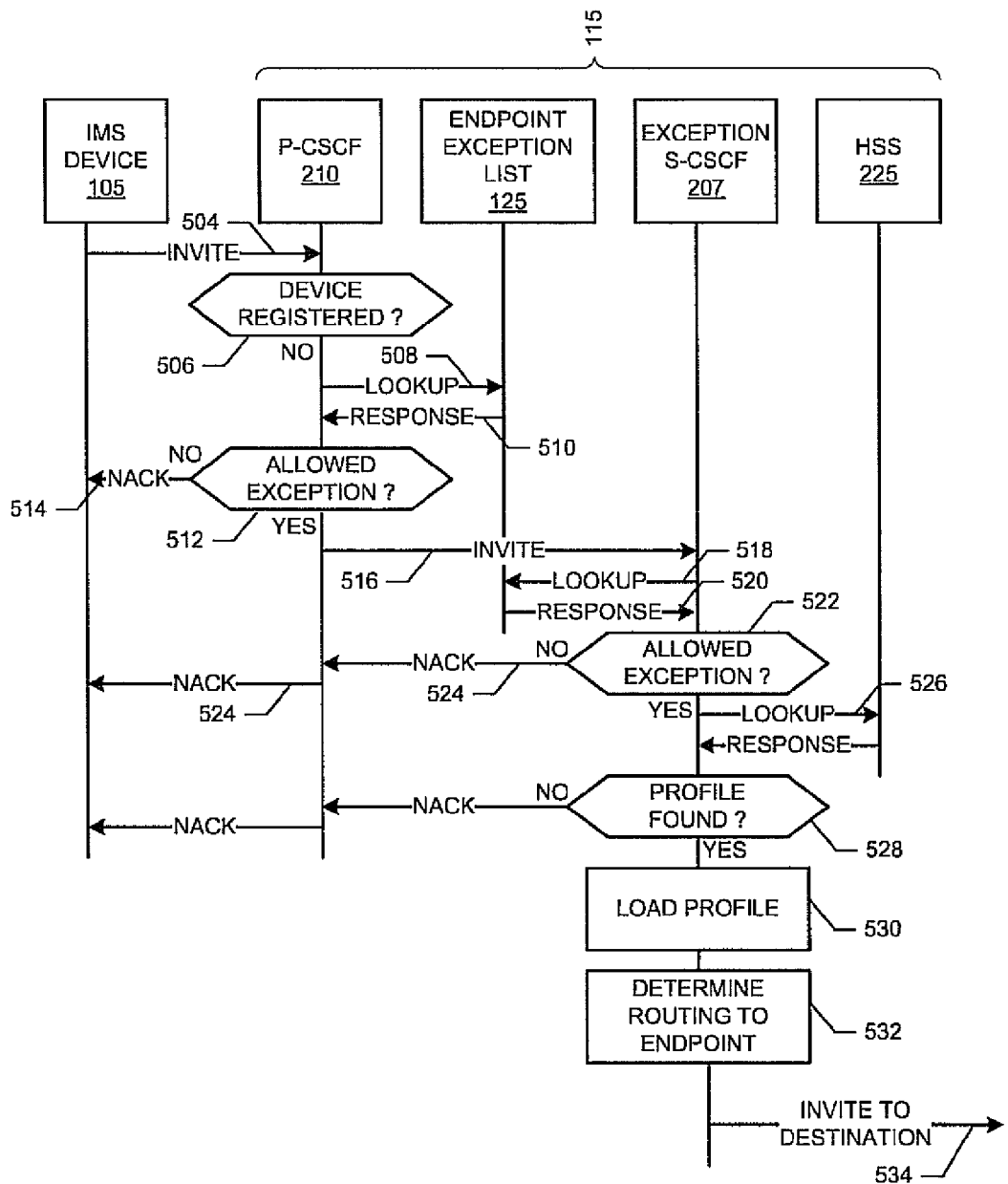
FIGS. 5 and 6 illustrate example protocol message exchanges, and flowcharts representative of machine accessible instructions that may be executed to implement any of the example P-CSCF, the example exception S-CSCF and/or, more generally, the example IMS networks of FIGS. 1 and 2.
Figure 6:
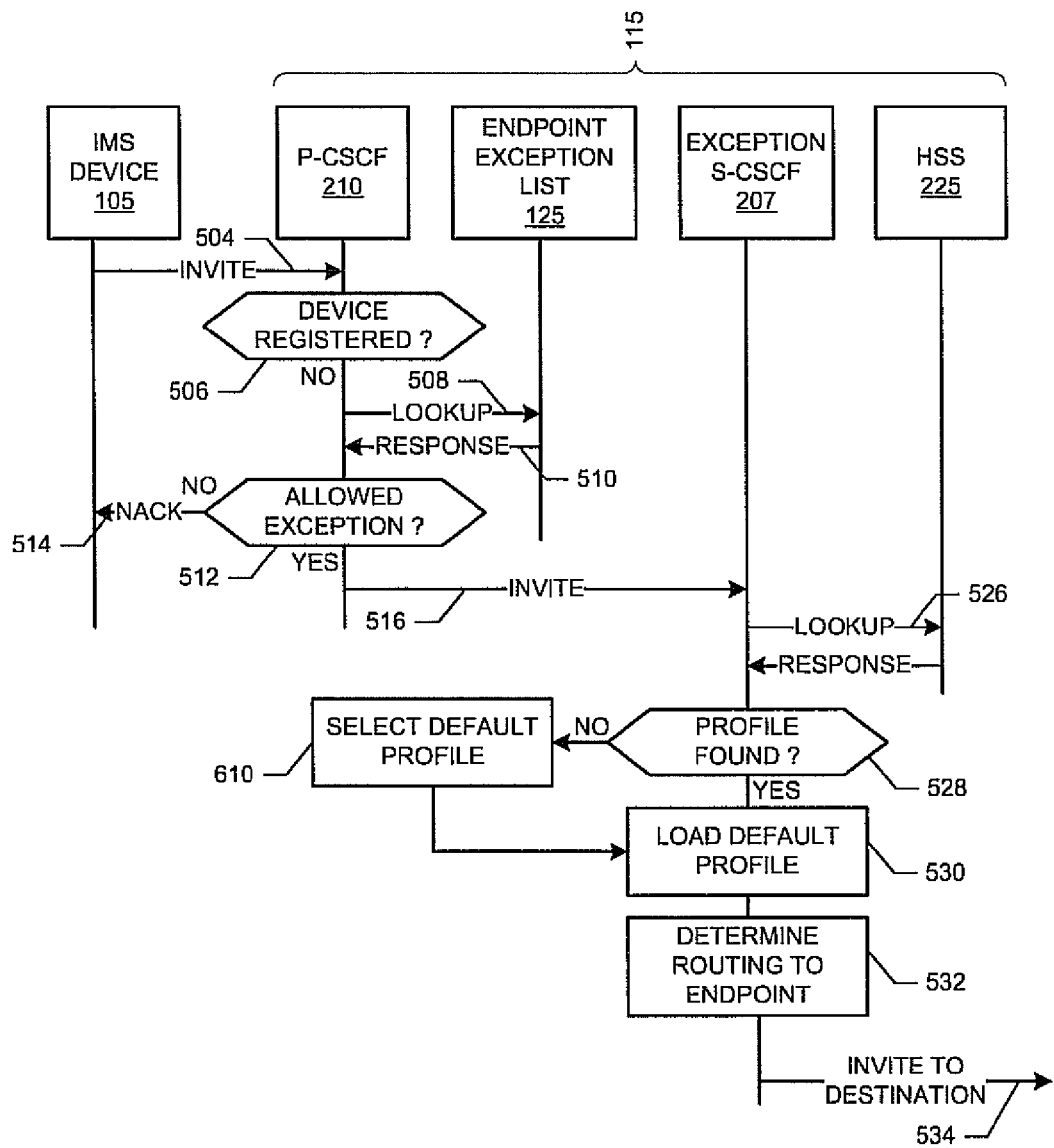

FIGS. 5 and 6 illustrate example protocol message exchanges, and flowcharts representative of machine accessible instructions that may be executed to implement the example P-CSCF 210, the example exception S-CSCF 207 and/or, more generally, the example IMS network 115 of FIGS. 1 and 2. The example exchanges and/or the example machine accessible instructions of FIGS. 5 and/or 6 may be carried out by a processor, a controller and/or any other suitable processing device. For example, the example exchanges and/or the example machine accessible instructions of FIGS. 5 and/or 6 may be embodied in coded instructions stored on a tangible medium such as a flash memory, a read-only memory (ROM) and/or random-access memory (RAM) associated with a processor (e.g., the example processor 705 discussed below in connection with FIG. 7). Alternatively, some or all of the example exchanges and/or the example machine accessible instructions of FIGS. 5 and/or 6 may be implemented using any combination(s) of application specific integrated circuit(s) (ASIC(s)), programmable logic device(s) (PLD(s)), field programmable logic device(s) (FPLD(s)), discrete logic, hardware, firmware, software, etc. Also, some or all of the example exchanges and/or the example machine accessible instructions of FIGS. 5 and/or 6 may be implemented manually or as any combination(s) of any of the foregoing techniques, for example, any combination of firmware, software, discrete logic and/or hardware. Persons of ordinary skill in the art will readily appreciate that many other methods of implementing the example P-CSCF 210, the example exception S-CSCF 207 and/or, more generally, the example IMS network 115 of FIGS. 1 and 2 may be employed. For example, the order of execution of the blocks of the example flowcharts and/or the example exchanges of FIGS. 5 and/or 6 may be changed, and/or some of the blocks described may be changed, eliminated, sub-divided, and/or combined. Additionally, persons of ordinary skill in the art will appreciate that any or all of the example exchanges and/or the example machine accessible instructions of FIGS. 5 and/or 6 may be carried out sequentially and/or carried out in parallel by, for example, separate processing threads, processors, devices, discrete logic, circuits, etc.

The illustrated example exchange of FIG. 5 begins with the IMS device 205 sending a communication session initiation request (e.g., a SIP INVITE protocol message) 504 to the example IMS network 115. The IMS network 115 (e.g., the example P-CSCF 210) receives the SIP INVITE message 504 and determines whether the IMS device 105 is registered (block 506). If the IMS device 105 is registered (block 506), the P-CSCF 210 and/or, more generally, the example IMS network 115 handles the requested communication session in accordance with any number of past, present and/or future communication protocol(s), specification(s) and/or standard (s). However, for clarity of the illustrated example of FIG. 5, the handling of a communication session request for a registered IMS device 105 is not shown in FIG. 5.

If the IMS device 105 is not registered (block 506), the P-CSCF 210 determines if the communication session is directed to an allowed exception endpoint by performing a lookup 508 of the endpoint exception list 125 to obtain a response 510 (e.g., YES or NO) that represents whether the communication session is directed to an allowed exception endpoint. If the communication session is not directed to an allowed exception endpoint (block 512), the P-CSCF 210 sends a response 514 (e.g., a SIP protocol NACK message) to the IMS device 105 indicating that the requested communication session can not be established. Control then exits from the illustrated example of FIG. 5.

If the communication session is directed to an allowed exception endpoint (block 512), the P-CSCF 210 sends a SIP INVITE message 516 to the exception S-CSCF 207. Because the exception S-CSCF 207 may receive and/or process SIP messages for registered IMS devices 105, the exception S-CSCF 207 determines if the communication session is directed to an allowed exception endpoint by performing a lookup 518 of the endpoint exception list 125 to obtain a response 520 (e.g., YES or NO) that represents whether the communication session is directed to an allowed exception endpoint. If the communication session is not directed to an allowed exception endpoint (block 522), the exception S-CSCF 207 sends a response 524 (e.g., a SIP NACK protocol message) via the P-CSCF 210 to the IMS device 105 indicating that the requested communication session can not be established. Control then exits from the illustrated example of FIG. 5.

If the communication session is directed to an allowed exception endpoint (block 522), the exception S-CSCF 207 determines if a profile for the IMS device 105 is stored in the HSS 225 by performing a lookup 526. If a profile for the IMS device 105 is found in the HSS 225 (block 528), the exception S-CSCF 207 loads the profile for the IMS device 105 (block 530). The exception S-CSCF 207 determines routing to the destination (e.g., by performing one or more electronic numbering (ENUM) and/or domain name service (DNS) lookups and/or queries (not shown)) (block 532). Based upon the routing determined at block 532 (e.g., an IP address of an I-CSCF for the destination), the exception S-CSCF 207 sends a SIP INVITE protocol message 534 to initiate the establishment of the requested communication session. The requested communication session is then negotiated and/or established in accordance of any number of past, present and/or future communication protocol(s), specification(s) and/standard(s).

Returning to block 528, if a profile for the IMS device 105 is not found in the HSS 225 (block 528), the exception S-CSCF 207 sends a response 524 (e.g., a SIP protocol NACK message) via the P-CSCF 210 to the IMS device 105 indicating that the requested communication session can not be established. Control then exits from the illustrated example of FIG. 5. An example purpose for checking for a profile is to facilitate the handling of communication sessions for defined, but not activated and/or registered, IMS devices 105. However, checking for a profile need not be performed. Additionally or alternatively, the exception S-CSCF 207 may handle a communication session for an unregistered IMS device 105 without the use of a profile.

Persons of ordinary skill in the art will readily appreciate that the example exchanges and/or the example machine accessible instructions illustrated in FIG. 5 can be modified in any number of ways. For example, FIG. 6 illustrates an alternative example protocol message exchange, and alternative flowcharts representative of machine accessible instructions that may be executed to implement the example P-CSCF 210, the example exception S-CSCF 207 and/or, more generally, the example IMS network 115 of FIGS. 1 and 2. Because portions of the illustrated example of FIG. 6 are identical to that discussed above in connection with FIG. 5, the description of those portions of FIG. 6 are not repeated here. Instead, identical elements (e.g., blocks and/or messages) are illustrated with identical reference numerals in FIGS. 5 and 6, and the interested reader is referred back to the descriptions presented above in connection with FIG. 5 for a complete description of those like numbered elements.

Compared to the example shown in FIG. 5, the exception S-CSCF 207 of FIG. 6 does not perform the lookup 518 of the endpoint exception list 125 shown in FIG. 6. Instead, the exception S-CSCF 207 assumes that the SIP INVITE protocol message 516 corresponds to an allowed exception endpoint. Moreover, at block 528 of FIG. 6, if a profile for the IMS device 105 is not found in the HSS 225, the exception S-CSCF 207 of FIG. 6 may select a default profile for the IMS device 105 (block 610), and control proceeds to block 530 of FIG. 6 to load the default profile for the IMS device 105.

Figure 7:
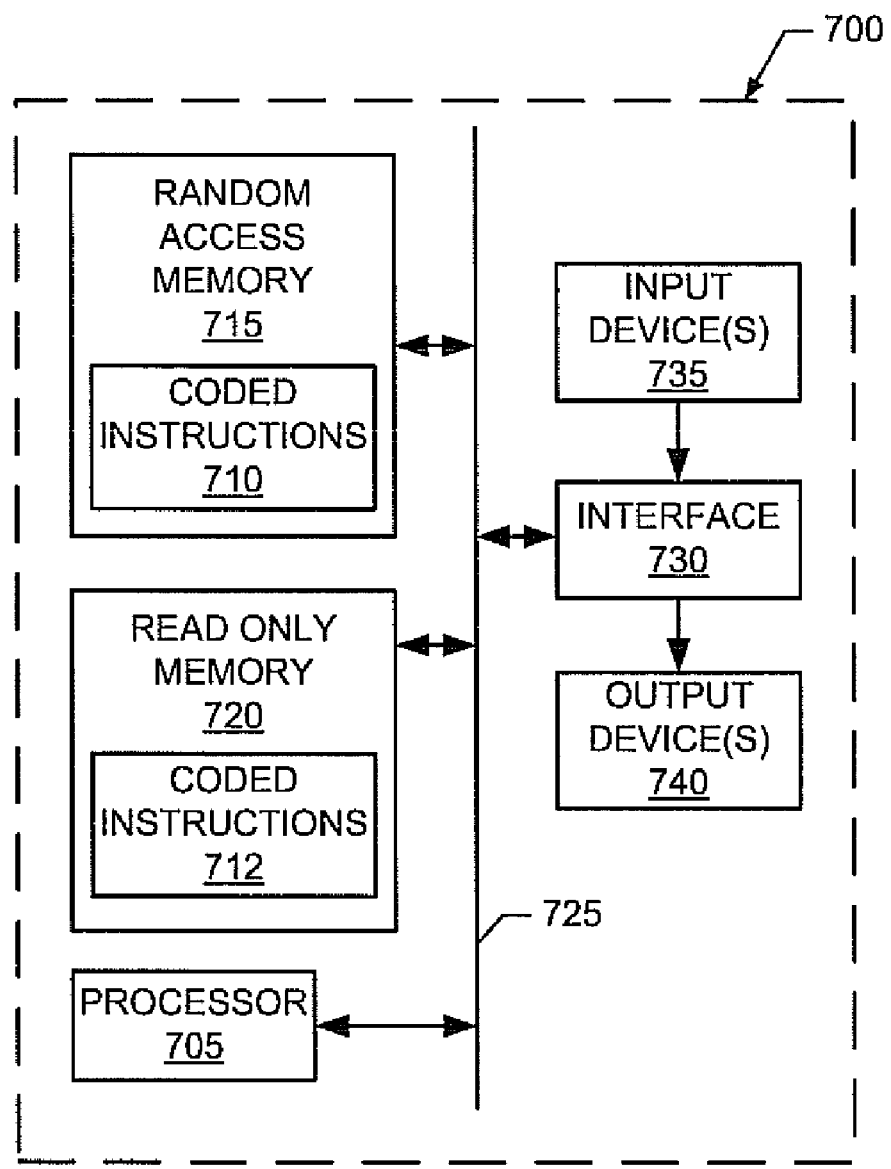
FIG. 7 is a schematic illustration of an example processor platform that may be used and/or programmed to carry out the example message exchanges and/or the example machine accessible instructions of FIGS. 5 and/or 6 to implement any of all of the example methods and apparatus described herein.

FIG. 7 is a schematic diagram of an example processor platform 700 that may be used and/or programmed to implement all or a portion of the example P-CSCF 210, the example exception S-CSCF 207 and/or, more generally, the example IMS networks 115 of FIGS. 1 and 2. For example, the processor platform 700 can be implemented by one or more general purpose processors, processor cores, microcontrollers, etc.

The processor platform 700 of the example of FIG. 7 includes at least one general purpose programmable processor 705. The processor 705 executes coded instructions 710 and/or 712 present in main memory of the processor 705 (e.g., within a RAM 715 and/or a ROM 720). The processor 705 may be any type of processing unit, such as a processor core, a processor and/or a microcontroller. The processor 705 may execute, among other things, the example exchanges and/or the example machine accessible instructions of FIGS. 5 and 6 to implement the example P-CSCF 210, the example exception S-CSCF 207 and/or, more generally, the example IMS networks 115 described herein.

The processor 705 is in communication with the main memory (including a ROM 720 and/or the RAM 715) via a bus 725. The RAM 715 may be implemented by DRAM, SDRAM, and/or any other type of RAM device, and ROM may be implemented by flash memory and/or any other desired type of memory device. Access to the memory 715 and 720 may be controlled by a memory controller (not shown). The RAM 715 may be used to store and/or implement, for example, the example endpoint exception lists 125 of FIGS. 1 and 2.

The processor platform 700 also includes an interface circuit 730. The interface circuit 730 may be implemented by any type of interface standard, such as an external memory interface, serial port, general purpose input/output, etc. One or more input devices 735 and one or more output devices 740 are connected to the interface circuit 730. The input devices 735 and/or output devices 740 may be used to, for example, receive, send and/or exchange SIP protocol messages.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or equivalents and successor tangible storage media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
   determining whether a user endpoint associated with an internet protocol multimedia subsystem session initiation message is registered;
   when the user endpoint is determined to be unregistered, determining whether the internet protocol multimedia subsystem session initiation message is directed to a first exception endpoint listed in an exception endpoint list by performing a lookup in the endpoint exception list based upon a destination specified in the internet protocol multimedia subsystem session initiation message, the first exception endpoint corresponding to a service to establish an account for the user endpoint;
   performing an electronic numbering query to obtain routing to the first exception endpoint; and
   establishing an internet protocol multimedia subsystem session on behalf of the user endpoint determined to be unregistered when the internet protocol multimedia subsystem session initiation message is directed to the first exception endpoint.

2. The method as defined in claim 1, wherein the user endpoint comprises an internet protocol multimedia subsystem device.

3. The method as defined in claim 1, further comprising rejecting the internet protocol multimedia subsystem session initiation message when the internet protocol multimedia subsystem session initiation message is not directed to one of the exception endpoints of the exception endpoint list and the user endpoint is unregistered.

4. The method as defined in claim 1, wherein the internet protocol multimedia subsystem session initiation message comprises a session initiation protocol INVITE protocol message.

5. The method as defined in claim 1, wherein establishing the initiated internet protocol multimedia subsystem session comprises sending a session initiation protocol INVITE protocol message to the first exception endpoint.

6. The method as defined in claim 1, wherein determining whether the internet protocol multimedia subsystem session initiation message is directed to the first exception endpoint is performed by a proxy call session control function server.

7. The method as defined in claim 1, further comprising determining at a serving call session control function server whether a profile for the user endpoint determined to be unregistered is available.

8. The method as defined in claim 7, further comprising determining at the serving call session control function server whether the internet protocol multimedia subsystem session initiation message is directed to the first exception endpoint.

9. The method as defined in claim 7, further comprising sending a session initiation protocol INVITE protocol message to the first exception endpoint when the profile is available.

10. The method as defined in claim 7, wherein the profile comprises at least one of an assigned telephone number, an Internet protocol address for a serving call processor, a quality of service parameter or a maximum allowable transmit bandwidth.

11. The method as defined in claim 1, wherein the exception endpoint list comprises a public safety answering point.

12. The method as defined in claim 1, wherein the exception endpoint list comprises a security system monitoring station number.

13. The method as defined in claim 1, further comprising, when the user endpoint is registered, establishing the internet protocol multimedia subsystem session on behalf of the user endpoint without determining whether the internet protocol multimedia subsystem session initiation message is directed to one of the exception endpoints of the exception endpoint list.

14. An apparatus, comprising:
   a memory storing machine readable instructions; and
   a processor to execute the instructions to perform operations comprising:
      determining whether a user endpoint associated with an internet protocol multimedia subsystem session initiation message is registered;
      when the user endpoint is determined to be unregistered, determining whether the internet protocol multimedia subsystem session initiation message is directed to a first exception endpoint included in an exception endpoint list by performing a lookup in the endpoint exception list based upon a destination specified in the internet protocol multimedia subsystem session initiation message, the first exception endpoint corresponding to a service to register the user endpoint;
      performing an electronic numbering query to obtain routing to the first exception endpoint; and
      establishing an internet protocol multimedia subsystem session on behalf of the user endpoint determined to be unregistered when the internet protocol multimedia subsystem session initiation message is directed to the first exception endpoint.

15. The apparatus as defined in claim 14, further comprising a second memory to store the exception endpoint list.

16. The apparatus as defined in claim 14, wherein the internet protocol multimedia subsystem session initiation message is a session initiation protocol INVITE protocol message.

17. The apparatus as defined in claim 14, wherein the processor is to establish the initiated internet protocol multimedia subsystem session by sending a session initiation protocol INVITE protocol message to the first exception endpoint.

18. The apparatus as defined in claim 14, wherein the processor is to reject the communication session initiation message when the communication session initiation message is not directed to any of the exception endpoints included in the exception endpoint list.

19. The apparatus as defined in claim 14, wherein the processor is to implement a call session control function server.

20. The apparatus as defined in claim 14, wherein the processor is to determine whether a profile for the user endpoint determined to be unregistered is available.

21. The apparatus as defined in claim 20, wherein the processor is to send a second session initiation message to the first exception endpoint when the profile is available.

22. The apparatus as defined in claim 14, wherein the exception endpoint list comprises a public safety answering point.

23. The apparatus as defined in claim 14, wherein, when the internet protocol multimedia subsystem device is determined to be registered, the processor is to establish the internet protocol multimedia subsystem session on behalf of the user endpoint determined to be registered without determining whether the internet protocol multimedia subsystem session initiation message is directed to one of the exception endpoints of the exception endpoint list.

24. A memory comprising instructions that, when executed, cause a machine to perform a method comprising:
   determining whether a user endpoint associated with an internet protocol multimedia subsystem session initiation message is unregistered;
      when the user endpoint is unregistered, determining whether the internet protocol multimedia subsystem session initiation message is directed to a first exception endpoint identified in an exception endpoint list by performing a lookup in the endpoint exception list based upon a destination specified in the internet protocol multimedia subsystem session initiation message, the first exception endpoint corresponding to a service for registration of the user endpoint;
      performing an electronic numbering query to determine routing to the first exception endpoint; and
      establishing an internet protocol multimedia subsystem session on behalf of the user endpoint determined to be unregistered when the internet protocol multimedia subsystem session initiation message is directed to the first exception endpoint.

25. The memory as defined in claim 24, wherein the instructions are to cause the machine to reject the internet protocol multimedia subsystem session initiation message when the internet protocol multimedia subsystem session initiation message is not directed to one of the exception endpoints of the exception endpoint list.

26. The memory as defined in claim 24, wherein the instructions are to cause the machine to establish the initiated internet protocol multimedia subsystem session when the internet protocol multimedia subsystem session initiation message is directed to the first exception endpoint by sending a session initiation protocol INVITE protocol message to the first exception endpoint.

27. The memory as defined in claim 24, wherein the instructions are to cause the machine to determine whether a profile for the user endpoint determined to be unregistered is available.

28. The memory as defined in claim 24, wherein the instructions are to cause the machine to establish the internet protocol multimedia subsystem session without determining whether the internet protocol multimedia subsystem session initiation message is directed to one of the exception endpoints of the exception endpoint list when the user endpoint is registered.

\* \* \* \* \*